United States Patent [19]

Nicollini et al.

[11] Patent Number: 5,014,304
[45] Date of Patent: May 7, 1991

[54] METHOD OF RECONSTRUCTING AN ANALOG SIGNAL, PARTICULARLY IN DIGITAL TELEPHONY APPLICATIONS, AND A CIRCUIT DEVICE IMPLEMENTING THE METHOD

[75] Inventors: Germano Nicollini, Piacenza, Italy; Daniel Senderowicz, Berkeley, Calif.

[73] Assignee: SGS-Thomson Microelectronics S.r.L., Milan, Italy

[21] Appl. No.: 469,759

[22] Filed: Jan. 24, 1990

Related U.S. Application Data

[63] Continuation of Ser. No. 139,014, Dec. 29, 1987, abandoned.

[51] Int. Cl.$^5$ .............................................. H04M 1/00
[52] U.S. Cl. ..................................... 379/399; 328/27; 341/144
[58] Field of Search .......................... 341/144; 328/27; 379/399

[56] References Cited

PUBLICATIONS

"Passive and Active Network Analysis and Synthesis", A. Budak, Houghton Mifflin Co., Boston, 1974, p. 553.
"Digital and Analog Communication Systems", L. Couch III, MacMillan Publishing Co., N.Y., 1983, pp. 20-24, 109-111.
"Linear Applications", National, J. Byerly et al., Dec. 1972, pp. AN69-1-AN69-3.
"Solid-State Circuits and Applications", D. Mackenroth, Prentice-Hall, Englewood Cliffs, N.J., 1984, p. 147.
"Digital Filters", R. W. Hamming, Prentice-Hall, Englewood Cliffs, N.J., 1983, pp. 38-43.
Signetics Corporation, 1972, pp. 6-24, 6-27, 6-30, 6-36, 6-42.

Primary Examiner—Jin F. Ng
Assistant Examiner—Jhancy Augustus
Attorney, Agent, or Firm—Rosen, Dainow & Jacobs

[57] ABSTRACT

A method of reconstructing an analog signal, particularly for digital telephony, comprises a first step of digital-to-analog conversion, wherein a first reconstruction of the analog signal is provided by introducing a distortion component into the frequency spectrum whose amplitude decreases with the signal frequency, and a second step of filtering carried out by means of a reconstruction filter provided with integrators and having a cut-off frequency $F_t$. That attenuating distortion component is utilized instead of one of the integrators in the reconstruction filter, to afford a reduction of the overall design of the circuit device operating in accordance with this method, and bring about, as a result, decreased occupation of the integrated circuit and power dissipation.

8 Claims, 1 Drawing Sheet

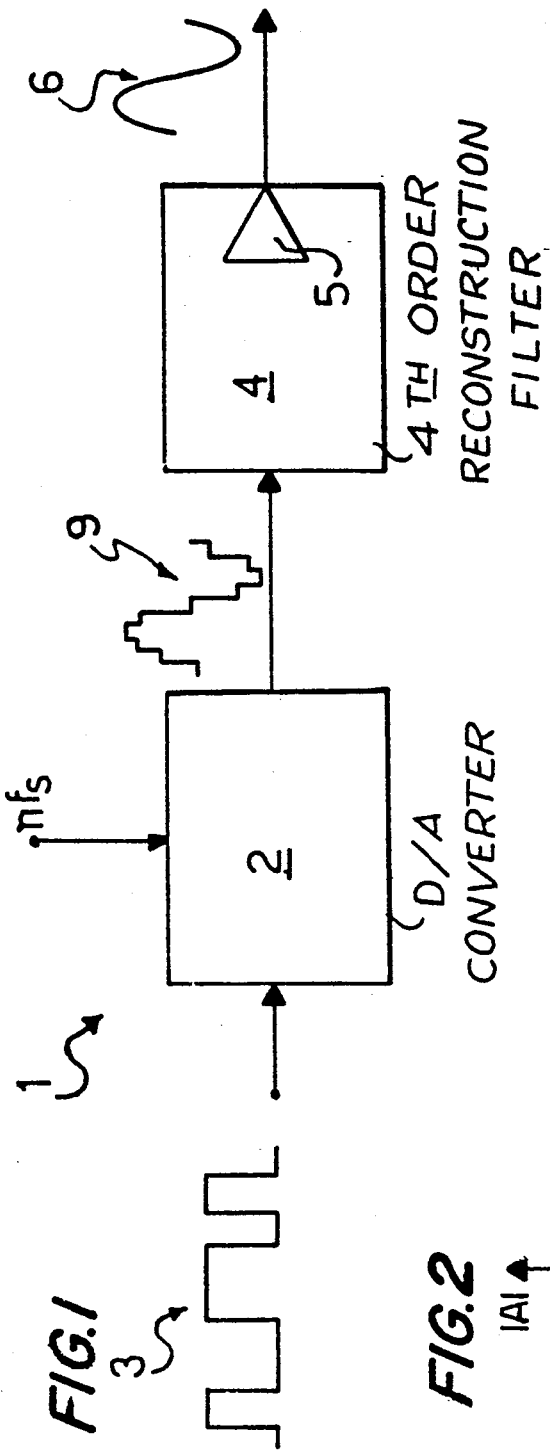

METHOD OF RECONSTRUCTING AN ANALOG SIGNAL, PARTICULARLY IN DIGITAL TELEPHONY APPLICATIONS, AND A CIRCUIT DEVICE IMPLEMENTING THE METHOD

This application is a continuation Ser. No. 07/139,014, filed Dec. 29, 1987 now abandoned.

This invention relates to a method of reconstructing an analog signal, particularly in digital telephony applications, which method comprises a first step of digital-to-analog conversion whereby a first reconstruction of the analog signal is provided by introducing a distortion component into the frequency spectrum whose amplitude decreases with the signal frequency, and a second step of low-pass filtering carried out by means of integrators at a cut-off frequency $f_t$.

The invention also relates to a circuit device for reconstructing an analog signal, particularly in digital telephony applications, of a type which comprises a digital-to-analog converter having its output connected to a low-pass reconstruction filter provided with integrators and having a cut-off frequency $f_t$, said converter introducing a distortion component into the frequency spectrum whose amplitude decreases with the signal frequency.

As is known, in the field of telephone transmission of digital signals, specifically so-called PCM (Pulse-Code-Modulation) signals, there exists a need to convert such signals back into other, so-called analog, signals upon reception.

The digital signals, as obtained from the analog-to-digital of a phonic analog signal, are transmitted over a telephone line; on reception, the phonic signal must therefore be reconstructed by means of another, digital-to-analog conversion.

For the effectuation of such reconstruction, the prior art has proposed that a digital-to-analog converter be employed in association with a reconstruction filter. The converter receives the digital signal at its input from the transmission line in the form of a sequence of binary logic values, referred to as bits, and outputs a first reconstruction of the original phonic signal which is comprised of a stepped analog waveform wherein each step corresponds to the amplitude values of the original phonic signal as quantized for constant time periods $T_s$. That is, the first reconstruction of the signal consists of a signal holding step over periods equal to $T_s$.

More specifically, the converter operation is clocked by a so-called clock which is a multiple of a sampling frequency $f_s$—worldwide set to 8 kHz—and the above-noted quantization time period is obtained from the inverse of that frequency $f_s$.

The signal holding step over time periods equal to $T_s$ introduces, into the signal frequency spectrum, an amplitude distortion component, e.g. of the sin $(\pi f/f_s)/\pi f/f_s$ type, which has the disadvantage of producing an attenuation which is not constant with frequency in the signal amplitude and, accordingly, introduces distortion in the signal.

To obviate that problem, a reconstruction filter is cascade connected to the digital-to-analog converter output. The filter is effective to remove the high frequency components of the signal by operating as a low-pass filter in the 0 to 3,300 Hz range, the latter value being the cut-off frequency $f_t$ as set by worldwide standards.

An operational amplifier is usually connected to the reconstruction filter output which regenerates the analog signal with a low output impedance.

Integrated circuits are currently available with a reconstruction filter so-called of the fifth order on account of it having five active integrators comprising as many operational amplifiers, which have been found appropriate to meet the specifications for filtering set forth by the worldwide standards and to remove the distortion component noted above.

However, that prior approach, while substantially achieving its object, has drawbacks originating from the large integrated circuit area occupied by such a high number of operational amplifiers and from power dissipation.

The solutive idea underlying this invention is to utilize the frequency response of the amplitude distortion component introduced during the holding step instead of the frequency response of a single pole of the reconstruction filter.

The technical problem on which this invention is based is that of providing a method and a device for reconstructing an analog signal from a PCM digital signal, which have such operational and structural characteristics as to overcome the drawbacks outlined in the foregoing.

This problem is solved by a reconstruction method as indicated being characterized in that said distortion component is substituted for the frequency response of any of said integrators.

The problem is further solved by a circuit device of the type specified hereinabove being characterized in that said reconstruction filter is of the fourth order comprising four integrators, and that said distortion component is substituted for an integrator.

The features and advantages of the method according to this invention will be more clearly understood from the following detailed description of a device for implementing the method, to be taken in conjunction with the accompanying illustrative and non-limitative drawing.

In the drawing:

FIG. 1 shows a reconstruction device according to the invention; and

FIG. 2 shows a graph of the frequency response of a distortion signal present in the device of FIG. 1.

With reference to the drawing figures, the numeral 1 designates comprehensively and schematically a device according to the invention for reconstructing a phonic analog signal from a so-called PCM digital signal, as used in telephony.

Indicated at 2 is a digital-to-analog converter of conventional design, which receives at its input a digital waveform 3. The converter 2 also receives, as a further input thereto, a so-called clock pulse which is a multiple of a sampling frequency $f_s$ equal to 8 kHz.

The reference numeral 9 denotes an analog waveform output by the converter 2 and corresponding to the original analog phonic signal as amplitude quantized over constant time periods $T_s = 1/f_s$, where $f_s$ is the so-called sampling frequency.

Advantageously, the converter 2 output is connected to the input of a reconstruction filter 4 which is, according to the invention, of the fourth order. Thus, the filter 4 comprises four active integrators consisting of operational amplifiers, not shown.

The final stage of the filter 4 comprises the fourth of the aforesaid operational amplifiers, which is in particular a power amplifier 5.

The power amplifier 5 is therefore integrated advantageously as the final stage in the reconstruction filter 4. From the filter 4 output the analog waveform 6 is obtained which represents the reconstructed analog signal corresponding to the digital waveform 3.

The reconstruction method on the inventive circuit device will be next described with specific reference to the example of FIG. 2, which shows graphs of the frequency response modules, respectively for the amplitude distortion component sin $(\pi f/f_s)/\pi f/f_s$, indicated by the curve 7, and the function $$1/\sqrt{1 + (f/f_t)^2},$$

indicated by the curve 8.

The curve 8 represents the frequency response module of a transfer function i of a single pole corresponding to an integrator in the reconstruction filter.

Since the curves 7 and 8 are similar for high frequencies much higher than the quantization frequency $f_s$ on account of both having a zero at infinity, on the inventive device the frequency response 7 is used of the distortion component in lieu of an integrator corresponding to a single pole with a frequency response given by the curve 8. In particular, for frequencies up to the cut-off frequency $f_t$, the difference between the attenuation due to that distortion over that to be obtained by using an integrator to provide the single pole is compensated for.

The filter 4 comprising four integrators, according to this invention, obviously shall have to be optimized, by known techniques to the skilled one, to compensate for the increasing attenuation with frequency due to the difference between the curves 7 and 8 for frequencies within the range of frequency 0 to cut-off frequency $f_t$.

Using the filter of the fourth order according to the invention, the digital-to-analog conversion shows to be of the same quality as that to be obtained with the filter of the fifth order according to the prior art.

The final stage of the filter 4, being provided with a power operational amplifier, serves both functions of an integrator and low impedance drive for a load connected downstream of the filter.

The device for reconstructing an analog signal, according to this invention, affords the significant advantage of being implementable with a greatly reduced number of components, to thus decrease both the dissipation of power and the area occupied in the integrated circuit.

The graph of FIG. 2 illustrates the frequency response of the distortion component introduced into the signal by the digital-to-analog converter 2. In the figure, $F_t$ corresponds to the cut-off frequency of a filter, $F_s$ is the sampling frequency, and $2F_s-5F_s$ represent multiples of the latter. The curve 7 shows the frequency response of the actual output of the signal 9 from the D/A converter 2, which, as was noted, periodically decreases in amplitude (A) as the frequency increases. Curve 8 signifies the frequency response model of an integrator. FIG. 2 illustrates that the two curves 7 and 8 are similar for high frequencies so that the attenuation or distortion component of the converter 2 can be used in place of an integrator in the reconstruction filter 4.

I claim:

1. A method of reconstructing an analog signal previously converted by pulse code modulation to a digital signal, comprising the steps:
   a. subjecting the received digital signal to a digital-to-analog conversion process to produce a first reconstruction of the analog signal, said digital-to-analog conversion process introducing into the frequency spectrum of the first reconstruction a distortion component whose amplitude decreases with increasing frequency,
   b. subjecting the first reconstruction of the analog signal to low-pass filtering by means of a reconstruction filter including only four integrators with a cut-off frequency $F_t$ to produce a second reconstruction of the analog signal, said four integrators present in said reconstruction filter functioning to remove the distortion component of the first reconstruction, the frequency response of the introduced amplitude distortion component functioning to attenuate the signal above the cut-off frequency $F_t$.

2. A method as set forth in claim 1, wherein the reconstruction filter has a passband of 0-3300 Hz, where $F_t=3300$ Hz, said digital signal being a digital telephonic signal.

3. The method of claim 2, wherein said first reconstruction has a frequency response defined by:

$$\frac{\sin(\pi f/fs)}{\pi f/fs},$$

where fs equals the sampling frequency used in the digital-to-analog conversion process and f equals any frequency of the analog signal, and each integrator has a transfer function substantially equal to:

$$\frac{1}{[1 + (f/fs)^2]^{\frac{1}{2}}}.$$

4. A circuit for reconstructing an analog signal previously converted by pulse code modulation to a digital signal in digital telephony, comprising:
   a digital-to-analog converter having an input for receiving the digital signal and producing at an output a first reconstruction of the analog signal, said digital-to-analog converter introducing into the frequency spectrum of the first reconstruction a distortion component whose amplitude decreases with increasing frequency,
   a low-pass reconstruction filter having an input for receiving the analog signal from the converter, said reconstruction filter having only four integrators with a cut-off frequency $F_t$ producing at an output a second reconstruction of the analog signal, the integrators present in said reconstruction filter functioning to remove the distortion component in the first reconstruction, the frequency response of the introduced amplitude distortion component functioning to attenuate the signal above the cut-off frequency $F_t$.

5. A circuit as set forth in claim 4, wherein the reconstruction filter has a passband of 0-3300 Hz, where $F_t=3300$ Hz.

6. The circuit of claim 5, wherein said first reconstruction has a frequency response defined by:

$$\frac{\sin(\pi f/fs)}{\pi f/fs},$$

where fs equals the sampling frequency used in the digital-to-analog converter, and f equals any frequency of the analog signal, and each integrator has a transfer function substantially equal to:

$$\frac{1}{[1 + (f/fs)^2]^{\frac{1}{2}}}.$$

7. The circuit of claim 5, wherein the final stage of said filter comprises a power operational amplifier.

8. The circuit of claim 4, wherein the first reconstruction has a frequency spectrum corresponding to the curve 7 in FIG. 2 of the drawing.

* * * * *

UNITED STATES PATENT AND TRADEMARK OFFICE
CERTIFICATE OF CORRECTION

PATENT NO. : 5,014,304

DATED : May 7, 1991

INVENTOR(S) : Nicollini et al.

It is certified that error appears in the above-identified patent and that said Letters Patent is hereby corrected as shown below:

On the title page, after "[22] Filed:    January 24, 1990" add as a new paragraph -- [30]    Foreign Application Priority Data
     January 9, 1987 [IT] Italy..................19038- /87--.

Signed and Sealed this

Fifteenth Day of December, 1992

Attest:

DOUGLAS B. COMER

*Attesting Officer*     *Acting Commissioner of Patents and Trademarks*